United States Patent [19]
Barmore, Jr.

[11] Patent Number: 5,886,642
[45] Date of Patent: Mar. 23, 1999

[54] TANK BARGE INTERFACE

[75] Inventor: Gaston C. Barmore, Jr., Pearland, Tex.

[73] Assignee: Midland Manufacturing Corp., Skokie, Ill.

[21] Appl. No.: 705

[22] Filed: Dec. 30, 1997

[51] Int. Cl.⁶ .................................................. G08B 21/00
[52] U.S. Cl. ...................... 340/644; 340/661; 340/687; 340/815.45; 324/556; 324/763; 361/42; 361/88
[58] Field of Search ................................... 340/644, 654, 340/661, 664, 687, 815.45; 324/753, 763, 556; 361/42, 86, 88

[56] References Cited

U.S. PATENT DOCUMENTS

| | | | |
|---|---|---|---|
| 3,912,879 | 10/1975 | Lawson .................................... | 340/652 |
| 4,163,939 | 8/1979 | Halstead et al. ......................... | 324/104 |
| 4,691,384 | 9/1987 | Jobe ......................................... | 359/167 |
| 5,136,280 | 8/1992 | Heggli ..................................... | 340/635 |
| 5,237,480 | 8/1993 | Dara ........................................ | 361/42 |
| 5,291,545 | 3/1994 | Stahl ....................................... | 379/377 |
| 5,323,014 | 6/1994 | Liscio et al. ............................. | 250/551 |
| 5,345,496 | 9/1994 | Galpin ..................................... | 379/29 |
| 5,445,093 | 8/1995 | Lilly, Jr. .................................. | 114/45 |
| 5,510,725 | 4/1996 | Schantz, Jr. et al. .................... | 340/645 |
| 5,532,675 | 7/1996 | White ...................................... | 340/515 |
| 5,555,421 | 9/1996 | Enzinna ............................. | 395/750.01 |
| 5,561,580 | 10/1996 | Pounds et al. .......................... | 361/104 |
| 5,592,033 | 1/1997 | Gold ........................................ | 250/551 |
| 5,608,769 | 3/1997 | Patton et al. ............................. | 377/20 |
| 5,610,591 | 3/1997 | Gallagher ................................ | 340/618 |
| 5,748,008 | 5/1998 | Landreth ................................. | 324/763 |

Primary Examiner—Daniel J. Wu
Attorney, Agent, or Firm—Emrich & Dithmar

[57] ABSTRACT

A hand-held interface couples fill level detection switch terminals on a tank barge with current source terminals of a dockside facility. The interface includes a dockside connector adapted to be connected to the dockside terminals and a barge connector adapted to be connected to the barge terminals and test circuits for respectively testing the lading level detection switches. Each test circuit includes a battery connected in series with the light source of an optocoupler across a pair of terminals of the barge connector. Also connected across the battery are the light-sensitive switching element of the optocoupler, the coil of a normally-open relay and an indicator LED, the contacts of the relay being connected across a pair of terminals of the dockside connector. When the interface connectors are respectively connected to the barge and dockside terminals, the level detection switch under test completes the circuit across the battery through the optocoupler light source so that the optocoupler is energized. Current is drawn from the battery only when the interface is connected to the barge terminals and the level detection switch is closed. The condition of the relay contacts mirrors the condition of the level detection switch under test. Each optocoupler is of a type which responds only to voltage above a predetermined threshold level.

19 Claims, 1 Drawing Sheet

TANK BARGE INTERFACE

BACKGROUND OF THE INVENTION

1. Field of the Invention

The present invention relates to circuitry for testing alarm switches used in overfill control systems of tank barges. The invention relates in particular to test systems usable in connection with dockside facility alarm and load/unload control systems.

2. Description of the Prior Art

Typically, the tanks of tank barges are equipped with overfill control systems which include liquid level sensing devices for detecting when significant levels of liquid lading in the tank are reached. Each detection device includes one or more normally-closed switches, which are opened when the liquid level reaches a corresponding level. Such devices typically include an overfill switch, which corresponds to an overfill condition of the tank, and may optionally include a high level switch, corresponding to a liquid level below the overfill condition but approaching it. These level sensing devices are used during the loading of the tank at a dockside facility.

There is typically no power source on the barge, for safety reasons in the event of highly volatile or combustible ladings. Accordingly, the level sensing device is coupled to a connector which can be connected to a dockside test and alarm system when the barge is at a dockside facility for loading or unloading. The dockside system applies a low current to each level sensing switch which, by government regulation, must normally be closed. The barge is typically provided with a manual system for operating the level sensing device to simulate an overfill or alarm condition and thereby open the switch. The tankerman performs this manual test while connected to the dockside facility and, if the switch opens properly the current will be interrupted. If the current is not interrupted, this indicates that there is a defect in the level sensing system and the barge will not be permitted to be loaded until the situation is remedied. This can be very time consuming and expensive, particularly where a barge has multiple tanks, since it may not be apparent which is the source of the problem, so each may have to be checked. During loading the level sensing device remains connected to the dockside alarm system and, if an alarm condition occurs during loading, the filling equipment will automatically be shut down.

While, by government regulation, there is a maximum voltage and current which can be applied to the barge fill level switches by the dockside alarm and test system so as to maintain an intrinsically safe condition on the barge, there is no minimum. Thus, different dock facilities utilize different voltages and currents, some of which currents can be as low as 0.1 mA (100 microamps). A signal current of 100 microamps may be insufficient to reliably detect tank barge fill level switch opening during certain conditions, such as high humidity conditions. If, for example, the maximum output voltage is 9.0 VDC, an impedance of as much as 90,000 ohms between the fill level switch conductors can result in a 100 microamp leakage current. The presence of this leakage current prevents the dock facility from detecting the barge level fill level switch opening.

Midland Manufacturing Company sells a transportable high level and overfill alarm system, which can be carried onto a barge and has its own built-in battery power supply for applying a test signal to the fill level switch circuits for purposes of testing same. It can also be connected to a dockside facility for actuating the dockside alarm and automatic shutdown system in the event of an overfill condition during loading. It applies a test signal current which is high enough to reliably detect level sensing switch opening in any conditions. It also uses optocouplers for optically isolating the tank alarm circuitry from the dockside facility alarm panel when the unit is connected to the dockside facility. More particularly, the light source of the optocoupler is connected in circuit with the barge level sensing switch, while the light-responsive switching element of the optocoupler is connected in circuit with the coil of a relay, the contacts of which are connected with the dockside facility, so that the condition of the relay contacts mirrors the condition of the barge level sensing switch.

While this prior transportable system works well, it has certain drawbacks. It incorporates its own alarm system, including strobe lights and a siren and it is rather heavy and bulky and may require two men to carry on board. Furthermore, it is rather expensive, costing several thousand dollars. Also, because it uses logic gate optocouplers, it requires two separate supply voltages, one to provide the test signal to the barge level sensing switches and another supply voltage to the logic circuitry. This requires that the system be connected to the power supply during the entire time that it is in operation and, since the optocouplers have a relatively high output leakage current of about 500 microamps and require a logic supply current of 4.8 mA, an ON-OFF switch is necessitated to avoid undue battery drain.

SUMMARY OF THE INVENTION

It is a general object of the invention to provide an improved system for testing barge level sensing switches, which avoids the disadvantages of prior systems while affording additional structural and operating advantages.

An important feature of the invention is the provision of a test system which is small, compact and lightweight, being capable of hand-held use.

In connection with the foregoing feature, a further feature of the invention is the provision of a system of the type set forth, which can be incorporated in an interface between a barge and a dockside facility.

Still another feature of the invention is the provision of a test system of the type set forth which can reliably test barge level sensing switch circuits in all weather conditions and at the same time provide intrinsically safe operating conditions and electrical isolation from dockside facilities.

In connection with the foregoing feature, a further feature of the invention is the provision of a system of the type set forth, which is battery-powered and minimizes battery drain.

A still further feature of the invention is the provision of a test system of the type set forth, which does not require the use of an ON-OFF switch and draws current only when the level sensing switch under test is closed.

Yet another feature of the invention is the provision of a system of the type set forth, which is of relatively simple and economical construction.

Certain ones of these and other features of the invention may be attained by providing a hand-held interface for coupling two barge terminals on a tank barge with two dockside terminals of a dockside facility, wherein the barge has a normally-closed lading level detection switch connected across the barge terminals and the dockside facility has test and alarm apparatus including a current source connected across the dockside terminals so that the level detection switch closes a circuit through the current source when the barge terminals are connected directly to the dockside terminals, the interface comprising: a power supply, an optocoupler having a light source and a light-responsive switching element wherein the light source is connected in circuit with the power supply, a relay having a coil and normally-open contacts wherein the coil is connected in circuit with the switching element and the power supply, a dockside connector connected across the relay contacts and adapted to be connected to the dockside terminals, and a barge connector connected to the power supply and to the light source and adapted to be connected to the barge terminals for completing a circuit across the power supply so that current is drawn from the power supply only when the barge connector is connected to the barge terminals and the level detection switch is closed.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
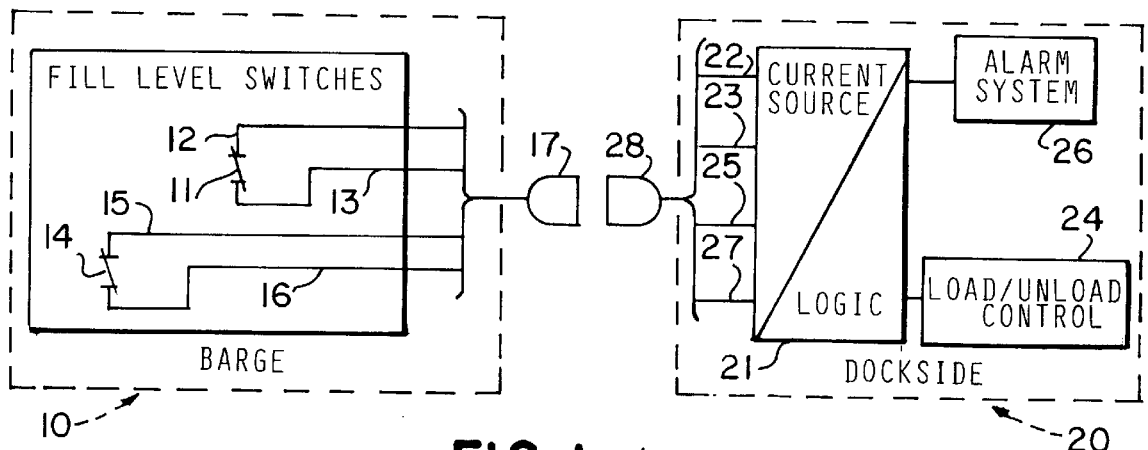
FIG. 1 is a partially schematic and partially functional block diagrammatic view of a prior art interconnect system between a barge and a dockside facility.

Referring to FIG. 1, there is illustrated a prior art arrangement for testing barge lading level sensing systems at a dockside facility. More specifically, there is illustrated a barge 10 provided with a tank for containing liquid lading, the tank being provided with an overfill control system which includes one or more fill level switches. The overfill control system will typically include at least an overfill switch 11 connected across a pair of terminals 12, 13 and may also include a high level switch 14 connected across terminals 15, 16 for detecting a level approaching, but not having yet reached, an overflow condition. The terminals 12, 13, 15, and 16 all terminate in an industry standard barge inlet connector 17. While a single tank is illustrated on the barge 10, it will be appreciated that it could have any number of tanks, each of which is typically provided with the illustrated overfill control system.

A dockside facility 20 includes equipment to control loading and unloading of the barge 10. The dockside facility 20 has a current source 21 with output cables 22, 23 for connecting to barge terminals 12 and 13 and output cables 25 and 27 for connectiong to barge terminals 15 and 16. The cables 22, 23, 25 and 27 terminate in an industry standard terminal connector 28. The dockside facility 20 also includes load/unload control equipment 24, which may include pumps, valves, motors and the like. The dockside facility 20 also includes an alarm system 26 for providing visible and/or audible signals in the event of a high level or overfill condition on the barge 10.

In use, when the barge 10 is docked at the dockside facility 20 for loading or unloading, the connector 17 is connected to the connector 28. The current source 21 applies a test signal current to each of the load level switches 11, 14, for each tank of the barge 10. The tankerman will then manually open each switch by manually operating the level sensing device in the manner described above, to make sure that the switches are operating properly. If they are, this will be detected at the dockside facility 20 by sensing of the interruption of the signal current, and loading will be permitted to commence. Otherwise, loading will be prohibited. During loading the current source 21 remains connected to the fill level switches so that, if an alarm condition occurs during loading, this will be signaled to the dockside facility and actuate the alarm system 26.

Figure 2:
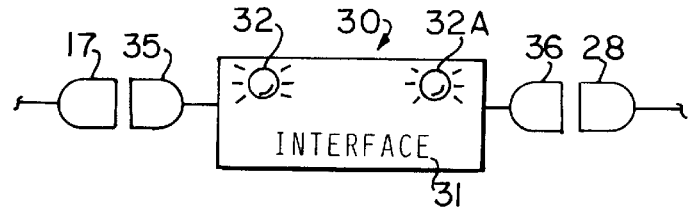
FIG. 2 is a functional block diagram of the interface of the present invention interposed between the barge and the dockside facility.

Referring to FIG. 2, the present invention includes an interface 30 having a small, hand-held housing 31, which is adapted to be interposed between the barge connector 17 and the dockside connector 28. The interface 30 is provided with two indicator lamps 32 and 32A, preferably in the form of LEDs, respectively corresponding to the two fill level switches 11, 14. The interface housing 31 is also provided with a barge connector 35, which is similar to the dockside facility connector 28 and is adapted for connection to the barge connector 17, and a dockside connector 36, which is similar to the barge connector 17 and is adapted for connection to the dockside connector 28.

Figure 3:
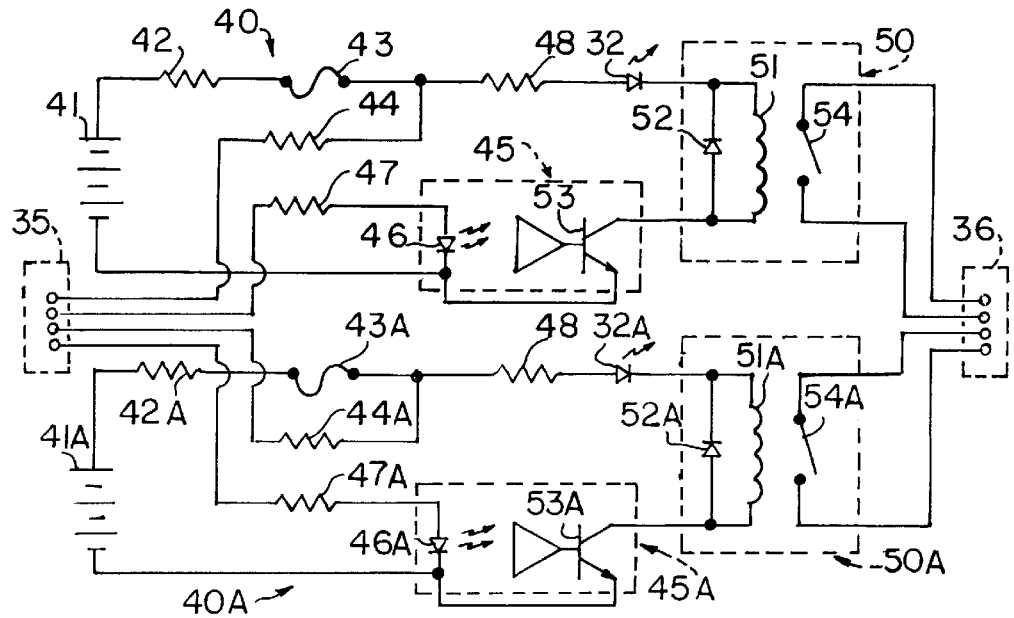
FIG. 3 is a schematic circuit diagram of the interface of FIG. 2.

Referring to FIG. 3, the interface 30 includes two substantially identical test circuits 40 and 40A for, respectively, testing the fill level switches 11 and 14 on the barge 10. Since the test circuits are of identical construction, only the test circuit 40 will be described in detail, the corresponding parts of the test circuit 40A having corresponding reference numbers with the suffix"A". The test circuit 40 has a power supply in the form of a battery 41, which may be a 9-VDC alkaline battery, the anode of which is connected through a resistor 42, a fuse 43 and a resistor 44 to one of the pins or terminals of the connector 35. The cathode of the battery 41 is connected to the light source of an optocoupler 45. In this case, the optocoupler 45 is a voltage threshold detection optocoupler, the light source of which is an LED 46, which has its cathode connected to the cathode of the battery 41 and its anode connected through a resistor 47 to another terminal of the connector 35.

The junction between the fuse 43 and the resistor 44 is connected through a resistor 48 to the anode of a LED 32, the cathode of which is connected to one terminal of the coil 51 of a relay 50. The coil 51 is shunted by a diode 52 which has its cathode connected to the cathode of the LED 32. The other terminal of the coil 51 is connected to the light-responsive switching element of the optocoupler 45. In this case, that switching element is a phototransistor 53, which has its collector connected to the coil 51 and its emitter connected to the cathode of the battery 41. The relay 50 has normally-open contacts 54 which are connected across two pins or terminals of the connector 36.

In operation, when the connectors 35 and 36 of the interface 30 are, respectively, connected to the barge connector 17 and the dockside connector 28, the contacts 54 of the relay 50 are connected across a corresponding line of the current source 21 on the dockside facility 20, while the series connection of the battery 41, the resistors 42, 44 and 47 and the optocoupler LED 46 are connected across the overflow switch 11 of the barge 10. It will be appreciated that the other test circuit 40A is similarly connected across another line of the dockside current source 21 and across the high level switch 14 of the barge 10.

Thus, when the overflow switch 11 is in its normally closed condition, a circuit therethrough is completed by the battery 41, the resistors 42, 44 and 47 and the optocoupler LED 46. The resistors serve to limit the current through the battery 41 to an intrinsically safe level, e.g., 12 ma at 9 VDC, and yet significantly greater than any possible leakage current across the overflow switch terminals 12, 13. With the optocoupler LED 46 thus energized, the phototransistor 53 thereof will become conductive, energizing the coil 51 of the relay 50 for closing the contacts 54 thereof. Also, the LED 32 will be energized, signaling that there is a closed circuit condition through the overflow switch 11. When the overflow switch 11 is opened, as by manual testing by the tankerman, the circuit through the optocoupler LED 46 is broken, deenergizing it and accordingly deenergizing the relay coil 51 for opening its contacts 54, this condition being signaled by deenergization of the LED 42. Thus, it will be appreciated that the condition of the relay contacts 54 mirrors the condition of the overflow switch 11, so that the interface 30 is essentially transparent to the dockside facility 20. The test current applied to the overflow switch 11 is high enough to reliably detect switch opening during any atmospheric conditions while being at an intrinsically safe level, the barge fill level switches being electrically isolated from the dockside facility 20.

It is a significant aspect of the invention that the optocouplers 45 and 45A are of the voltage threshold detection type, which will respond only to voltages above a predetermined threshold level. Also, it is significant that no ON-OFF switch is required by the interface 30. Thus, the relay coil 51 can remain permanently connected in circuit across the battery 41, because no significant current can be drawn until the interface 30 is connected to the barge connector 17 and the overflow switch 11 is closed. Otherwise, the optocoupler 45 is deenergized and the phototransistor 53 thereof presents an essentially open circuit, having an output leakage current in the range of about 0.002 microamps, which is a negligible drain on the battery 41. Because the interface 30 incorporates only small and lightweight components, it can be housed in a very compact, hand-held housing 31. Furthermore, while the above description relates to the use of the interface 30 while connected to the dockside facility 20, it can also be utilized onboard the barge 10 for testing of the fill level switches 11 and 14, even when the barge 10 is not connected to the dockside facility 20.

From the foregoing, it can be seen that there has been provided an interface for use between a barge and a dockside facility, for testing barge fill level switches and signaling the dockside facility of the condition of those switches while the switches remain electrically isolated from the dockside facility, all in a compact, hand-held unit which requires no ON-OFF switch and minimizes battery drain.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A hand-held interface for coupling two barge terminals on a tank barge with two dockside terminals of a dockside facility, wherein the barge has a normally-closed lading level detection switch connected across the barge terminals and the dockside facility has a current source connected across the dockside terminals so that the level detection switch closes a circuit through the current source when the barge terminals are connected directly to the dockside terminals, said interface comprising:

a power supply, an optocoupler having a light source and a light-responsive switching element wherein the light source is connected in circuit with the power supply, a relay having a coil and normally-open contacts wherein the coil is connected in circuit with the switching element and the power supply, a dockside connector connected across the relay contacts and adapted to be connected to the dockside terminals, and a barge connector connected to the power supply and to the light source and adapted to be connected to the barge terminals for completing a circuit across the power supply so that current is drawn from said power supply only when said barge connector is connected to the barge terminals and the level detection switch is closed.

2. The interface of claim 1, wherein said power supply provides a DC supply voltage.

3. The interface of claim 2, wherein said power supply is a battery.

4. The interface of claim 1, wherein said optocoupler is a passive device and said light-responsive switching element is switched only in response to incident light from said light source.

5. The interface of claim 4, wherein said light source is a light-emitting diode and said switching element is a phototransistor.

6. The interface of claim 1, wherein said optocoupler is responsive only to voltage above a predetermined threshold level.

7. The interface of claim 1, and further comprising an indicator LED connected in series with said coil for indicating when said coil is energized.

8. A hand-held interface for coupling two barge terminals on a tank barge with two dockside terminals of a dockside facility, wherein the barge has a normally-closed lading level detection switch connected across the barge terminals and the dockside facility has a current source connected across the dockside terminals so that the level detection switch closes a circuit through the current source when the barge terminals are connected directly to the dockside terminals, said interface comprising:

a barge connector adapted to be connected to the barge terminals, a dockside connector adapted to be connected to the dockside terminals, a power supply connected to the barge connector for connection across the level detection switch when the barge connector is connected to the barge terminals for applying a predetermined current through the level detection switch, a relay having a coil connected directly to the power supply and contacts which are closed when the coil is energized and are connected to the dockside connector for connection across the dockside current source when the dockside connector is connected to the dockside terminals, and an optocoupler including a light source connected to the barge connector so as to be connected in series with the power supply and the level detection switch when the barge connector is connected to the barge terminals and a light-responsive switching element connected in series with the relay coil across the power supply for conduction only when the light source is energized, whereby when the interface is connected between the barge terminals and the dockside terminals the condition of the relay contacts mirrors the condition of the barge level detection switch.

9. The interface of claim 8, wherein said power supply is a battery.

10. The interface of claim 8, wherein said optocoupler is a passive device and said light-responsive switching element is switched only in response to incident light from said light source.

11. The interface of claim 10, wherein said light source is a light-emitting diode and said switching element is a phototransistor.

12. The interface of claim 8, wherein said optocoupler is responsive only to voltage above a predetermined threshold level.

13. The interface of claim 8, and further comprising an indicator LED connected in series with said coil for indicating when said coil is energized.

14. A hand-held interface for coupling pairs of barge terminals on a tank barge with pairs of dockside terminals of a dockside facility, wherein the barge has two normally-closed lading level detection switches respectively connected across pairs of the barge terminals and the dockside facility has current sources respectively connected across pairs of the dockside terminals so that the level detection switches respectively close circuits through the current sources when the barge terminals are connected directly to the dockside terminals, said interface comprising:

a first test circuit including
   a first power supply,
   a first optocoupler having a first light source and a first light-responsive switching element wherein the first light source is connected in circuit with the first power supply, and
a first relay having a first coil and first normally-open contacts wherein the first coil is connected in circuit with the first switching element and the first power supply;

a second test circuit including
   a second power supply,
   a second optocoupler having a second light source and a second light-responsive switching element wherein the second light is connected in circuit with the second power supply, and
   a second relay having a second coil and second normally-open contacts wherein the second coil is connected in circuit with the second switching element and the second power supply;

a dockside connector connected across the first relay contacts and the second relay contacts and adapted to be connected to the dockside terminals; and a barge connector connected to the first and second power supplies and to the first and second light sources and adapted to be connected to the barge terminals for completing circuits across the power supplies so that current is drawn from said first power supply only when said barge connector is connected to the barge terminals and a first one of the level detection switches is closed and current is drawn from said second power supply only when said barge connector is connected to the barge terminals and a second one of the level detection switches is closed.

15. The interface of claim 14, wherein each of said first and second power supplies is a battery.

16. The interface of claim 14, wherein each of said first and second optocouplers is a passive device and in each of said first and second light-responsive switching elements is switched only in response to incident light from the corresponding one of said first and second light sources.

17. The interface of claim 16, wherein each of said first and second light sources is a light-emitting diode and each of said first and second switching elements is a phototransistor.

18. The interface of claim 14, wherein each of said first and second optocouplers is responsive only to voltage above a predetermined threshold level.

19. The interface of claim 14, and further comprising first and second indicator LEDs respectively connected in series with said first and second coils for indicating when said coils are energized.

* * * * *